United States Patent Office 3,051,665
Patented Aug. 28, 1962

3,051,665
METHOD OF FOAMING AN ADMIXTURE OF EPOXY RESIN, A CHLOROFLUOROCARBON, AND A CURING CATALYST
Marco Wismer, Gibsonia, and William R. Hydro, New Kensington, Pa., assignors to Pittsburgh Plate Glass Company, a corporation of Pennsylvania
No Drawing. Filed Feb. 2, 1960, Ser. No. 6,124
9 Claims. (Cl. 260—2.5)

This invention relates to foamed resins and to the preparation of the same, and it has particular relation to the preparation of a foam of an epoxy resin which cures rapidly without the addition of external heat at room temperature.

Foams of epoxy resins have been produced by mixing a chemical blowing agent into liquid epoxy resins. When the mixture is heated, the blowing agent decomposes to release small bubbles of gas, thus forming a cellulated or foam-like product.

These systems are all objectionable for many applications, and this is especially true where the foams are to be used as thermal insulation, sound insulation, or for other purposes in buildings and other structures where heating is difficult or impracticable. Often the facilities for performing the operations involved in preparing conventional foams are not at hand and are expensive even where the nature of the job being done permits their use.

In accordance with the provisions of this invention, liquid foamable mixtures of a gas-forming agent, an epoxy resin which is a polyglycidyl ether of a polyhydric compound and containing more than one oxirane ring, and a catalyst which is a salt of a polyvalent metal, are formed. These salts are represented by the Friedel-Crafts type catalysts and although the invention is not considered to be limited thereto, especial emphasis will be placed upon complexes of the halides of boron, such as boron trifluoride. Foamable mixtures as herein disclosed containing this type of catalyst can be very quickly foamed and cured to a thermoset state even without application of external heat.

The resultant foamed epoxy resins when prepared by the method herein disclosed, also have numerous valuable characteristics:

For example, as compared with such conventional foamed resins as those obtained from polyurethanes, they have good strength and are dimensionally stable.

They adhere very strongly to materials such as metals; namely, steel, aluminum, and to brick, stone and other materials.

They are well adapted for application by spray techniques.

They are well adapted for use in forming moldings in closed receptacles.

The epoxy resins employed in forming foams by application of the techniques of this invention may inherently be liquids at room temperature, or they may be solid resins which can be rendered liquid by use of solvents or by addition of a liquid epoxy resin. A reasonable degree of fluidity permitting mixing and foaming of the several components is necessary.

Starting epoxy resins, which are polyglycidyl ethers of polyhydric compounds and which may be used in forming foams in accordance with the present invention, comprise the reaction products of an excess of epichlorohydrin with a phenolic compound containing at least two phenolic hydroxyl groups. The reaction is usually conducted in the presence of an aqueous solution of a hydrogen halide acceptor, for example, sodium hydroxide, sodium carbonate or other base, adapted to combine as an acceptor with hydrogen chloride evolved in the reaction. The preparation of epoxy resins is shown in such United States patents as 2,633,458, 2,548,447, 2,824,083, and others.

Typical phenolic compounds employed in forming the liquid epoxy resins in the practice of the invention comprise a plurality (usually a pair) of benzene rings, each having a hydroxyl group substituted for a ring hydrogen, and benzene rings being bridged together by an alkylidene hydrocarbon group, such as propylidene or butylidene. Bisphenol A [2,2-bis(4-hydroxyphenyl)propane] is the most readily available of such phenolic compounds and is used herein by way of illustration. Compounds containing a plurality of phenolic hydroxyl groups attached to a benzene nucleus, such as hydroquinone, catechol, pyrogallol and the like, may be substituted therefor.

The invention also contemplates the use of epoxy resins from epichlorohydrin or other epihalohydrin and tetrachloro- or tetrabromo-p,p'-isopropylidene diphenol, such as are disclosed in a copending application, Serial No. 682,095, filed September 5, 1957, to Marco Wismer, in place of 2,2-bis(4-hydroxyphenyl)propane and epichlorohydrin. The invention also contemplates the use of 4,4-bis(4-hydroxyphenyl)-pentanoic acid as the phenolic component of the epoxy resin.

In most instances, the epichlorohydrin is employed in substantial excess of equivalency with respect to the hydroxyl groups in the phenol, and the ratio may be from about 3 to about 10 equivalents of the epichlorohydrin per equivalent of the phenolic compound, excess epichlorohydrin being distilled at the conclusion of the reaction.

A hydrogen halide acceptor is employed in an amount approximately to combine with the hydrogen halide formed in the reaction. At the end of the reaction, salt and excess of epichlorohydrin are removed.

Among the many polyols which may be utilized in preparing the epoxy resins that may be employed in the practice of this invention are included the following:

1,4-butanediol
Diethylene glycol
Trimethylolpropane
Tetrabromo-2,2-bis(4-hydroxyphenyl)propane
Tetrachloro-2,2-bis(4-hydroxyphenyl)propane
Bis(4-hydroxyphenyl)2,2-propane
4,4-dihydroxybenzophenone
Bis(4-hydroxyphenyl)1,1-ethane
Bis(4-hydroxyphenyl)1,1-isobutane
Bis(4-hydroxyphenyl)2,2-butane
Bis(4-hydroxy tertiary butyl phenyl)-2,2-propane
Bis(4-hydroxynaphthyl)methane
1,5-dihydroxynaphthylene The epihalohydrin component of the epoxy resin may be selected from the following group:

1-chloro-2,3-epoxy propane
1-chloro-2,3-epoxy butane
1-chloro-3,4-epoxy butane
2-chloro-3,4-epoxy butane
1-chloro-2-methyl-2,3-epoxy butane
1-bromo-2,3-epoxy pentane
2-chloromethyl-1,2-epoxy butane
1-bromo-4-methyl-3,4-epoxy pentane
1-bromo-4-ethyl-2,3-epoxy pentane
4-chloro-2-methyl-2,3-epoxy pentane
1-chloro-2,3-epoxy octane
1-chloro-2-methyl-2,3-epoxy octane
1-chloro-2,3-epoxy decane The polyol component and the epihalohydrin component disclosed may be reacted in accordance with conventional practice to provide polyglycidyl ethers of polyols which contain a plurality of oxirane rings, and mixtures thereof with blowing agents can be foamed and cured in the presence of catalysts comprising solutions of complexes of boron trifluoride as herein disclosed, even at room temperature.

Other compounds containing a plurality of oxirane rings may be substituted for the polyglycidyl ethers resulting from the reaction of the foregoing polyols and the epihalohydrins. Examples of these comprise epoxidized soya oil and 3,4-epoxy-6-methylcyclohexylmethyl-3,4-epoxy-methylcyclohexane carboxylate of the formula:

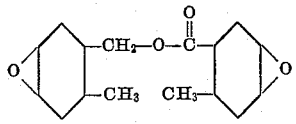

These can be blown and cured with a complex of boron trifluoride as a catalyst.

The art of preparing epoxy resins which are polyglycidyl ethers of polyhydric compounds and a halo epoxide and which can be used in practicing the invention, is well-known and is illustrated by the previously mentioned patents. Therefore, detailed discussion of the resins and their preparation is not considered to be necessary.

The epoxy resin molecules contain rings or epoxy groups of the formula

and in the instance of the resins from the reaction of 2,2-bis(4-hydroxyphenyl)propane are of epoxy equivalent weight in a range of about 100 to about 500. Epoxy resins which are inherently liquids and which may be used with or without added solvents in forming foams in accordance with the provisions of this invention, are of an epoxy equivalent weight of about 100 to 300. Epoxy resins of other equivalent weights may be used, provided the resins are liquid or can be rendered liquid at an appropriate temperature or by addition of solvents.

The following is a generalized formula of an epoxy resin embodying the invention:

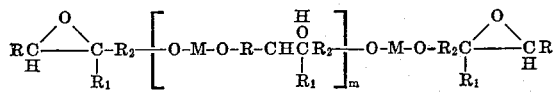

R being a group selected from a class consisting of hydrogen and aliphatic hydrocarbon groups containing from 1 to about 7 carbon atoms, $R_1$ being a group selected from the class consisting of hydrogen and methyl, and $R_2$ being an aliphatic hydrocarbon group containing from 1 to about 2 carbon atoms, $m$ is a number from 0 to about 10, and M is the organic moiety from one of the polyols such as have already been preferred to.

The formula of an average molecule of the starting epoxy polyether resin for 2,2-bis(4-hydroxyphenyl)propane is conventionally represented as follows:

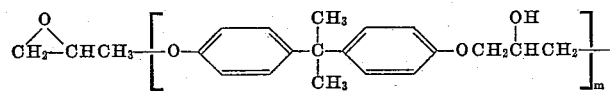

In the formula, $m$ is a number in the series 0, 1, 2, 3 . . . and is in the range of about 0 to about 10.

This formula is typical of the epoxy resins; in forming the resin, the 2,2-bis(4-hydroxyphenyl)propane could be replaced by dihydric compounds. The resultant compounds would then contain the corresponding moieties replacing:

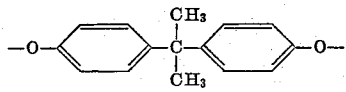

Molecules of the foregoing type contain terminal oxirane groups or epoxy groups and intermediate secondary hydroxyl groups which in the presence of complexes of boron trifluoride can be further reacted to interlink contiguous molecules, thus producing a hard, thermoset resin molecule. Heat is also generated in the mass and if a liquid gassing agent is present, the latter is volatilized and the gas is entrapped to produce a foam.

In the formation of a foamed epoxy resin, it is contemplated to obtain foaming action by heating air or other gas into an epoxy resin which is liquid at operating temperatures, or which has been rendered liquid by adding an appropriate solvent. However, it is presently preferred to employ blowing agents which can be added as liquids to the resin while the latter is in liquid state, but which volatilize in the resin at operating temperature to liberate a gas or vapor, effective to cause foaming action. It should not be necessary excessively to cool the resin in order to admit the incorporation of the blowing agent as a liquid. On the other hand, the blowing agent should be one which volatilizes at a temperature sufficiently low to foam the resin before the setting becomes too advanced. Since the epoxy resin component when catalyzed with the coordination compound of boron trifluoride, can be cured at room temperature without application of external heat, it follows that the chlorofluorocarbon used as a blowing agent must also be volatilized without application of external heat to the system; i.e., when the system is exposed to a temperature not substantially above room temperature. $CCl_3F$ boils at about 74.8° F., which is approximately room temperature, and $CCl_2F_2$ boils at −21.6° F., which is much below room temperature. These boiling points are in accordance with "The Condensed Chemical Dictionary," Fifth Edition, by Arthur and Elizabeth Rose, published by Rheinhold Publishing Corporation, New York (1956), page 502. The best agents seem to be the so-called "Freons," which are mixed fluoro- and chloro-carbons, such as $CCl_3F$, $CCl_2F_2$, and others. These compounds volatilize in the liquid resin at, or about the optimum temperature to give good foaming action.

The amounts of these agents employed to form a foam is adjusted to obtain a product of desired density. This value will vary within a range of about 0.5 or 2 pounds per cubic foot to about 30 pounds per cubic foot. In most instances, the foaming agent is employed in an amount within a range of about 10 to about 50 percent by weight based upon the epoxy resin.

In order to incorporate the blowing agent, the epoxy resin component is cooled to a temperature which is below the boiling point of the blowing agent. When the blowing agent is Freon F–11 ($CCl_3F$), the best temperature seems to be about 18° C. The blowing agent is incorporated by agitation. The mixture is maintained at about, or even below the foregoing temperature until it is to be used in forming a foam. The foregoing mixture is reasonably stable, so long as a catalyst is not present therein. This mixture constitutes one package or part, herein designated as package II, of a foamable mixture. This package may, if desired, include other components,

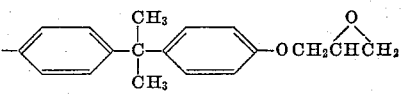

such as plasticizers, solvents for epoxy resins, or the like. The package is kept separate until a foam is to be formed; a catalyst mixture containing boron trifluoride or a complex thereof is then added. The mixture then foams and cures.

Catalysts for the curing of package II without application of external heat comprise solutions of complexes or coordination compounds of boron trifluoride. These are also termed addition compounds of the boron trifluoride; many different complexes of boron trifluoride are useful in this role. These solutions may be obtained by dissolving a preformed complex of boron trifluoride in a liquid medium, which can then be added as package I to package II containing the liquid epoxy resin component. Many complexes of boron trifluoride are described in the chemical literature. Some of them are described in Boron Trifluoride and Its Derivatives, by Booth, published by John Wiley and Sons, 1949. Selections for use in the practice of this invention may be made from this publication, and notably from Chapter 4 thereof.

Boron trifluoride complexes or coordination compounds which may thus be useful comprise the monohydrate, the dihydrate, and the trihydrate of boron trifluoride, boron trifluoride etherates, such as $BF_3$—$(CH_3CH_2OCH_2CH_3)$, di-n-butyl ether complex $$BF_3—(CH_3CH_2CH_3CH_2OCH_2CH_2CH_2CH_3)$$

the complexes of carboxylic acids and anhydrides of carboxylic acids, such as acetic and propionic acid or acetic anhydride and succinic anhydride; the complex of boron trifluoride and phenols, such as the complex of phenol per se or of boron trifluoride and cresol, the complex of boron trifluoride and hydroquinone, the complex of boron trifluoride and 2,2-bis(4-hydroxyphenyl)-propane; complexes of boron trifluoride and liquid monohydric alcohols, such as methyl alcohol, ethyl alcohol, propyl alcohol, isopropyl alcohol, butyl alcohol and hexyl alcohol, complexes of boron trifluoride and liquid dihydric or polyhydric alcohols, such as ethylene glycol, diethylene glycol, triethylene glycol, polyethylene glycol, having a molecular weight up to about 800; mixtures or complexes of boron trifluoride and esters, such as ethyl acetate and methyl acetate; mixtures or complexes of boron trifluoride and ketones, such as acetone, methyl ethyl ketone; mixtures of boron trifluoride and chlorinated hydrocarbons, such as chloroform; mixtures of boron trifluoride and organic phosphites, such as triphenyl phosphite, and others.

The complexes are employed in amounts to give desired speed of reaction. This amount is in a range of about 0.1 to 10 percent by weight based upon the epoxy resin component of the foamable mixture.

The complex is also dissolved in an appropriate organic liquid vehicle or solvent. Such solvent may be an excess of the same compound as is used in forming the complex. The complex may also be dissolved in an added solvent which, itself, may or may not be a complex-forming agent. The solvent of the complex preferably is also at least partially soluble, or emulsifiable with the epoxy polyether component.

The solvent is used in an amount at least to dissolve the boron trifluoride complex and may be in excess of that amount. Solutions containing from about ½ to about 50 percent of complex, the rest being solvent, are contemplated.

The solution of boron trifluoride complex constituting the catalyst for curing of the epoxy resin, as package I, is added to the second package (II) comprising the epoxy polyether-blowing agent mixture in an amount to provide a concentration of catalyst adequate to give the desired rate of gelling. This amount will usually fall within a range of about 0.1 to 10 percent by weight based upon the epoxy polyether.

In order to promote the formation and maintenance of a foam when packages I and II are mixed, it is convenient to add a surfactant or emulsifying agent to one or both of the packages (usually the solution of boron trifluoride complex constituting package I). Selections of surfactants can be made from those disclosed in the article entitled "Synthetic Detergents," by John W. McCutcheon, appearing in Soap and Chemical Specialties during the months of July, August, September and October 1955, and being revised and brought up to date in 1958. Very good results can be obtained by use of non-ionic types of emulsifiers, such as the condensates of polypropylene glycol with ethylene oxide, and being represented by the materials sold under the trade names of Pluronics of the series L-61, L-44, L-62, L-64, L-81, P-75 and F-68. Other valuable surfactants which in an amount in a range of about 0.1 to about 5 percent by weight based upon the resin components, can be used in the foamable mixtures, comprise the Tweens. Good examples of these include Tween 40 and Tween 81, both of which are very effective. Tween 40 is polyoxyethylene sorbitan monopalmitate and Tween 81 is polyoxyethylene sorbitan monooleate. Other surfactants could be used. The emulsifiers preferably are used in small amounts, e.g., about 0.1 to 5 percent by weight based upon the epoxy polyether component.

In the preparation of a foam from a glycidyl polyether in accordance with the provisions of the present invention, the packages I and II are made up as previously described, the first of these comprising a solution of boron trifluoride complex in an appropriate solvent, which may also be the same or a different coordinating agent from that initially employed to form the complex. This solution usually, though not necessarily, contains the emulsifying agent.

Package II, as previously indicated, comprises a liquid mixture of an epoxy polyether resin of appropriate epoxy equivalent weight and the gas producing agent. This package is formed at, and during any period of storage is maintained at, a temperature below or not substantially above that at which the gas producing agent will boil.

Packages I and II, so long as they are kept apart at proper temperatures, are stable and can be stored or transported without gelling. When they are to be used, the packages are mixed quickly either manually or by mechanical mixer. The catalyst package (I) when added to the epoxy polyether package, initiates cross-linking of the molecules in the latter. This causes an exothermal temperature rise that causes volatilization of the liquid gassing agent in the liquid mixture, and the gas becomes entrapped as small cells in the liquid. It is desirable that mixing be halted before substantial liberation of gas can occur. Obviously, the stirring operation should also be halted before appreciable cross-linking and gelling of the epoxy polyether can occur.

The mixing of packages I and II can be performed in a container, which is then used as the mold, or the packages can be mixed and then poured into a mold or other container, or the packages can be applied as by spreading or by blowing, or by spraying upon a support or backing such as a panel or a wall.

Cross-linking, with concomitant generation of heat, raises the temperature. External heating to volatilize the gassing agent and to complete the cross-linking of the epoxy polyether resin is not required, but is not precluded.

Normally the mixture can be stirred with safety for about 1 to 4 minutes, which is adequate for thorough incorporation of packages I and II into each other. Rapid foaming and setting manifest themselves in the liquid mixture within a short time after the two packages are mixed, and the mixture assumes a "creamy" texture. Any transfer of the foamable mixture to a mold or to a backing must be performed promptly, at least while the mixture is still liquid. The pot life depends upon the epoxy resin, the boron trifluoride complex, the temperature, and other factors.

Normally foaming is completed in a matter of minutes, e.g., about 2 to about 8 minutes, and the cross-linking action to provide a solid foam is substantially completed within about 10 minutes to about 1 hour, even at room temperature.

The following is an example illustrating the preparation of a foam which is adapted to cure at atmospheric temperatures in accordance with the provisions of the present invention.

EXAMPLE I

The epoxy polyether component employed in the preparation of this foam was a liquid reaction product of epichlorohydrin and 2,2-bis(4-hydroxyphenyl)propane, and was of an epoxy value of about 200. In the preparation of the foam, Freon-11, which is $CCl_3F$, was employed as a foaming agent. Boron trifluoride dihydrate was used as the catalyst, triethylene glycol and triphenyl phosphite being employed as solvents for the boron trifluoride-water complex.

The epoxy polyether component in an amount of 120 parts by weight was cooled to 18° C., 36 parts by weight of CCl₃F were added and the mixture was thoroughly agitated while the foregoing temperature was maintained. This component was designated as package II.

In the first (I) package were incorporated 12 parts by weight of a solution consisting of 98 percent of triethylene glycol and 2 percent of boron trifluoride dihydrate, and to the solution were added 3 parts by weight of a solution consisting of 98 percent of triphenyl phosphite and 2 percent of boron trifluoride dihydrate, and 0.6 part by weight of a commercial emulsifying agent, namely Pluronic L-81, already referred to.

Packages I and II were mixed at 18° C. by suitable mechanical agitation until incipient frothing was observed. Agitation was then discontinued and the resultant mixture was poured into an open cell. Observations were made as to when the foam began to rise and when the foam ceased to rise.

The mixing time for the two components was 2 minutes. The foam began to rise within 10 seconds, or after a total elapsed time of 2 minutes and 10 seconds; and the foam ceased to rise after another 2 minutes, the total time being 4 minutes and 10 seconds. The mixture foamed and set to a rigid structure without application of external heat. On the following day, it was observed that the foam had a density of 2 pounds per cubic foot, and that the majority of the cells thereof were closed. This foam could be formed on the job, for example, as a thermal insulation in a building, and in various other applications.

EXAMPLE II

This example is illustrative of the preparation of a series of foams in which the same or substantially the same techniques as described in Example I were followed. In the preparation of these foams, various factors such as the complexing agent for the catalyst, or the solvent for the catalyst, the epoxy component, the proportion of foaming agent, and other factors, were subjected to variation. The time of mixing, the time of start of foaming, and the time of conclusion of foaming were observed. The essential data of the various tests are tabulated as follows:

ponent as a coordinating agent. The column headed "Percent of Solvent" refers to the percentage of the solvent of the previously-mentioned column in the catalyst solution. The column headed "Weight of Solution" refers to the amount of catalyst solution used. The column headed "Weight of Emulsifier" refers to the amount of emulsifier used in the package. The emulsifier in each instance was Pluronic L-81. These several components constitute package I of the foamable mixture.

Under the heading "Package II," columns A, B, C, D and E refer to the weight of glycidyl polyether component. Column A is the epoxy polyether of epichlorohydrin and 2,2-bis(4-hydroxyphenyl)propane and is of an epoxy value of about 200. Column B is the triglycidyl ether of trimethylolpropane and epichlorohydrin, and is of an epoxy value of 175.6. The material of column C is a mixture of diglycidyl ethers prepared from epichlorohydrin and tetrachloro - 2,2' - bis(4 - hydroxyphenyl)-propane, tetrabromo - bis(4 - hydroxyphenyl)propane, and 1,4-butanediol. This mixed epoxy polyether is of an epoxy value of 230.6. The material of column D is a commercial material sold by the Union Carbide Company and is 3,4-epoxy-6-methylcyclohexylmethyl-3,4-epoxy-6-methylcyclohexane carboxylate. The material of column E is a mixture of 75 parts by weight of the solid epoxy resin sold as Epon 1001 and being obtained by the reaction of epichlorohydrin and 2,2-bis(4-hydroxyphenyl)propane of an epoxy value of about 500, and butyl glycidyl ether in an amount of 25 parts by weight.

In the foregoing table, the complexes of boron trifluoride and such compounds as acetic acid (diacetic acid complex of boron trifluoride), diethyl ether, di-n-butyl ether, phenol, and the like, may also be used.

In the foregoing examples, the use of a blowing agent in order to generate a foam in the epoxy resin mix has been emphasized. As previously indicated, it is also contemplated to obtain foaming by whipping gas, such as air, nitrogen, carbon dioxide, or others, into an emulsion of one of the foregoing epoxy resins and a complex of boron trifluoride. To this end, an epoxy resin from epichlorohydrin and 2,2-bis(4-hydroxyphenyl)propane may be employed as a starting resin. Preferably, the epoxy equivalent weight is about 200 to about 1000.

*Table*

| Package I | | | | | | Package II | | | | | | Mixing Time, Min. | Foaming Time, Min. | |
|---|---|---|---|---|---|---|---|---|---|---|---|---|---|---|
| Complexing Agent for BF₃ | Solution of Complex | | | Wt. of emulsifier | Glycidyl Polyether, Wt. | | | | | Wt. CCl₃F | | Start | Stop |
| | Percent of Complex | Solvent | Percent Solvent | Wt. of Solution | | A | B | C | D | E | | | | |
| 2 H₂O | 2 | TEG | 98 | 18 | 0.6 | 120 | | | | | 18 | 3' | 3' | 3'10'' |
| 2 H₂O | 2 | DPG | 98 | 18 | 0.6 | 120 | | | | | 18 | 2' | | 2'8'' |
| 2 H₂O | 3 | TEG | 97 | 15 | 1.0 | ¹63 | | | | | 30 | 2' | 2'10'' | 4'15'' |
| 2 H₂O | 2 / 2 | TEG / DPG | 98 / 98 | 6 / 6 | 0.6 | 120 | | | | | 18 | 3' | | 6'15'' |
| 2 H₂O | 3 / 3 | TEG / (C₆H₅)₃PO₃ | 97 / 97 | 10 / 2.5 | 1.0 | | 100 | | | | 25 | 5'10'' | 5'20'' | 5'40'' |
| 2 H₂O | 3 / 3 | TEG / (C₆H₅)₃PO₃ | 97 / 97 | 10 / 2.5 | 1.0 | | | 100 | | | 25 | 2'15'' | 2'45'' | 2'55'' |
| Ether | 4.3 | TEG | 95.7 | 18 | 1.0 | | | | 100 | | 30 | 8'' | 1'5'' | 1'15'' |
| 2 H₂O | 6 | CHCl₃ | 94 | 7 | 1.0 | 100 | | | | | 30 | 1' | 1'5'' | 1'15'' |
| 2 H₂O | 6 | Vircol-82 | 94 | 10 | 1.0 | | | | | 100 | 30 | 2'20'' | 2'30'' | 3'30'' |
| 2 H₂O | 6 | Vircol-82 | 94 | 10 | 1.0 | 100 | | | | | (²) | 2' | 2'15'' | 3'45'' |

TEG = triethylene glycol.
DPG = dipropylene glycol.
¹ This composition further included plasticizers, namely 32 parts by weight of chlorinated diphenyl and 5 parts by weight of tris-beta-chloroethyl phosphate.
² Trifluoro-trichloroethane in place of CCl₃F.

In the table, the column headed "Complexing Agent" refers to the agent which is combined by addition with boron trifluoride to provide a complex. The column headed "Percent of Complex" refers to the amount of the complex in the solution of the complex. The column headed "Solvent" refers to the agent in which the boron trifluoride complex was dissolved. It is not precluded that the complex itself includes at least some of this com- Packages I and II are made up as in Example I, but the blowing agent (CCl₃F) is omitted. The two components are vigorously whipped together to form a foam, which is then allowed to cure, the curing being effected by the action of the boron trifluoride dihydrate.

EXAMPLE III

Other Friedel-Crafts catalysts may be employed in the curing of the foams in accordance with the provisions of the present invention, and are illustrated by tin tetrachloride. In the preparation of a foam using this compound as a catalyst, a mixture was prepared comprising a liquid epoxy resin of epoxy equivalent weight of about 200 and being the reaction product of 2,2-bis(4-hydroxyphenyl)propane and epichlorohydrin formed in the presence of caustic soda. Approximately 100 grams of this epoxy resin was mixed with 30 grams of CCl₃F (Freon-11) at 18° C., and a mixture comprising 2 grams of tin tetrachloride and 0.6 gram of an emulsifying agent; namely, a condensate of ethylene oxide with a hydrophobic base formed by condensing propylene oxide with propylene glycol, and having the generalized formula:

$$HO(C_2H_4O)_a(C_3H_6O)_b(C_2H_4O)_cH$$

was added. The material had a molecular weight of about 2100 to 2500 and contained about 10 percent of polyoxyethylene. These are dissolved in 10 grams of acetone (solvent). The several components were mixed thoroughly by agitation over a period of 10 minutes. The mixture, in a suitable container, started to foam in 15 minutes and foaming was completed in about 20 minutes.

It will be apparent that tin tetrachloride in this example can be replaced by other Friedel-Crafts type catalysts, including aluminum trichloride and ferric chloride, zinc chloride, antimony pentachloride, and others. The chlorides may be replaced by the corresponding bromides.

The foams prepared in accordance with the foregoing examples have the advantages of improved strength, good adhesion to metals and other advantages as compared with conventional polyurethane resins.

EXAMPLE IV

This example is illustrative of the preparation of a molded epoxy foam in which the mold is closed to limit the degree of expansion of the mixture.

In preparing the foam, a first mixture (A) was made up comprising 98 percent by weight of triethylene glycol and 2 percent by weight of boron trifluoride dihydrate. A second mixture (B) was also made up comprising 98 percent by weight of triphenyl phosphite and 2 percent by weight of boron trifluoride dihydrate. These two mixtures were then mixed to provide component I of a foamable mixture. Component I comprised:

| | Parts by weight |
|---|---|
| Mixture A | 17.25 |
| Mixture B | 4.3 |
| Emulsifier (Pluronic L-81) | 0.62 |

A second component (II) of the foamable mixture was made up comprising:

| | Parts by weight |
|---|---|
| Epoxy resin ¹ (Bakelite 2774) | 123.0 |
| Trichlorofluoromethane (Freon-11) | 24.6 |

¹ Diglycidyl ether of 2,2-bis(4-hydroxyphenyl)propane of an epoxy equivalent weight of about 200.

The two components (I and II) were agitated together at a temperature of 17° C. for 105 seconds and were poured into a mold 1½″ x 10″ x 10″ having a glazed paper lining. The mold was then closed and the mixture foamed to fill the mold and was cured to provide a body which shrank only very slightly, had about 91 percent of closed cells and had a density of 2.76 pounds per cubic foot.

The forms of the invention as herein given may be considered as being by way of illustration. Numerous modifications may be made therein without departure from the spirit of the invention or the scope of the appended claims.

We claim:

1. The method of forming a foamed resin body which comprises mixing a liquid epoxy resin containing a plurality of terminal epoxy rings, a volatile chlorofluorocarbon that boils at not substantially above room temperature, an emulsifying agent, and a coordination compound of boron trifluoride, the mixture being at a temperature below the boiling point of the chlorofluorocarbon, and allowing the mixture to warm up without application of external heat whereby to foam and cure the same.

2. The method of forming a foamed resin body which comprises forming a mixture of a liquid epoxy resin which is a reaction product of epichlorohydrin and 2,2-bis(4-hydroxyphenyl)propane, a chlorofluorocarbon that boils at not substantially above room temperature, an emulsifying agent, and a coordination compound of boron trifluoride, the mixture being at a temperature below the boiling point of the volatile chlorofluorocarbon, and allowing the mixture to warm up without application of external heat whereby to foam and cure the same.

3. The method of forming a foamed resin body which comprises mixing a liquid epoxy resin containing a plurality of terminal epoxy rings, a volatile chlorofluorocarbon that boils at not substantially above room temperature, a coordination compound of boron trifluoride, and an emulsifying agent, the mixture being at a temperature below the boiling point of the chlorofluorocarbon, and allowing the mixture to warm up without application of external heat whereby to foam and cure the same.

4. The method according to claim 3 in which the epoxy resin is formed by reacting epichlorohydrin and 2,2-bis-(4-hydroxyphenyl)propane.

5. The method according to claim 5 in which the coordination compound of boron trifluoride is the dihydrate.

6. The method of forming a foamed resin body which comprises providing a liquid mixture of
(A) an epoxy resin containing a plurality of terminal epoxy rings,
(B) a chlorofluorocarbon containing a single carbon atom, and
(C) as a catalyst of curing, a coordination compound of boron trifluoride,
the mixture being at a temperature not substantially above room temperature, and allowing said mixture to foam and cure without application of external heat.

7. The method according to claim 6 wherein the chlorofluorocarbon is selected from the class consisting of CCl₃F and CCl₂F₂.

8. The method according to claim 6 wherein the coordination compound is boron trifluoride and a liquid aliphatic alcohol.

9. The method according to claim 6 wherein the epoxy resin is formed by the reaction of 2,2-bis(4-hydroxyphenyl)propane and epichlorohydrin, the chlorofluorocarbon is CCl₃F, and the coordination compound for the boron trifluoride is a liquid aliphatic alcohol.

References Cited in the file of this patent

UNITED STATES PATENTS

| 2,739,134 | Parry et al. | Mar. 20, 1956 |
| 2,831,820 | Aase et al. | Apr. 22, 1958 |
| 2,848,428 | Rubens | Aug. 19, 1958 |

FOREIGN PATENTS

| 783,956 | Great Britain | Oct. 2, 1957 |

UNITED STATES PATENT OFFICE
CERTIFICATE OF CORRECTION

Patent No. 3,051,665                                      August 28, 1962

Marco Wismer et al.

It is hereby certified that error appears in the above numbered patent requiring correction and that the said Letters Patent should read as corrected below.

Column 3, line 49, for "preferred" read -- referred --; column 10, line 37, for the claim reference numeral "5" read -- 4 --.

Signed and sealed this 17th day of December 1963.

(SEAL)
Attest:
ERNEST W. SWIDER

EDWIN L. REYNOLDS

Attesting Officer                          Attesting Commissioner of Patents